(12) United States Patent
Houts et al.

(10) Patent No.: US 12,361,718 B2
(45) Date of Patent: Jul. 15, 2025

(54) EMERGENCY VEHICLE INTERACTION

(71) Applicant: EMBARK TRUCKS, INC., San Francisco, CA (US)

(72) Inventors: Sarah Houts, Sunnyvale, CA (US); Gilbran James Alvarez, Santa Maria, CA (US)

(73) Assignee: EMBARK TRUCKS, INC., San Francisco, CA (US)

( * ) Notice: Subject to any disclaimer, the term of this patent is extended or adjusted under 35 U.S.C. 154(b) by 0 days.

(21) Appl. No.: 18/079,139

(22) Filed: Dec. 12, 2022

(65) Prior Publication Data

US 2024/0193956 A1 Jun. 13, 2024

(51) Int. Cl.
*G06V 20/56* (2022.01)
*B60W 40/02* (2006.01)
*B60W 60/00* (2020.01)

(52) U.S. Cl.
CPC ............ *G06V 20/56* (2022.01); *B60W 40/02* (2013.01); *B60W 60/001* (2020.02); *B60W 2554/4029* (2020.02); *B60W 2556/45* (2020.02); *B60W 2756/10* (2020.02)

(58) Field of Classification Search
None
See application file for complete search history.

(56) References Cited

U.S. PATENT DOCUMENTS

| | | | |
|---|---|---|---|
| 10,755,691 B1* | 8/2020 | Herman | G10K 11/17853 |
| 11,618,385 B1* | 4/2023 | Englander | B60R 1/06 |
| | | | 359/838 |
| 2008/0122597 A1* | 5/2008 | Englander | B60R 1/00 |
| | | | 348/E7.086 |
| 2011/0137521 A1* | 6/2011 | Levi | B60Q 1/509 |
| | | | 701/36 |
| 2019/0007794 A1* | 1/2019 | Thakur | H04W 4/023 |
| 2019/0027032 A1* | 1/2019 | Arunachalam | G08G 1/0965 |
| 2019/0137999 A1* | 5/2019 | Taguchi | B60W 30/09 |
| 2021/0072744 A1* | 3/2021 | Urano | B60W 60/0027 |
| 2021/0201676 A1* | 7/2021 | Tariq | G08G 1/012 |
| 2021/0325884 A1* | 10/2021 | Lennie | G05D 1/0088 |
| 2021/0362746 A1* | 11/2021 | Choi | B60W 50/14 |
| 2023/0047028 A1* | 2/2023 | Redmon | H04N 21/41422 |
| 2023/0102898 A1* | 3/2023 | Hsu | B60W 60/0015 |
| | | | 340/5.61 |

\* cited by examiner

*Primary Examiner* — David P. Merlino
(74) *Attorney, Agent, or Firm* — McDermott Will & Emery LLP

(57) ABSTRACT

Provided are systems and methods for detecting an emergency services vehicle and controlling an autonomous vehicle to interact with the emergency services vehicle and emergency services personnel. In one example, a method may include storing sensor data captured of an environment surrounding the vehicle while the vehicle is on a road, determining whether an emergency services vehicle is present in the surrounding environment based on the sensor data, and in response to determining that the emergency vehicle is present in the surrounding environment, generating an alert and transmitting the alert to a user interface.

20 Claims, 14 Drawing Sheets

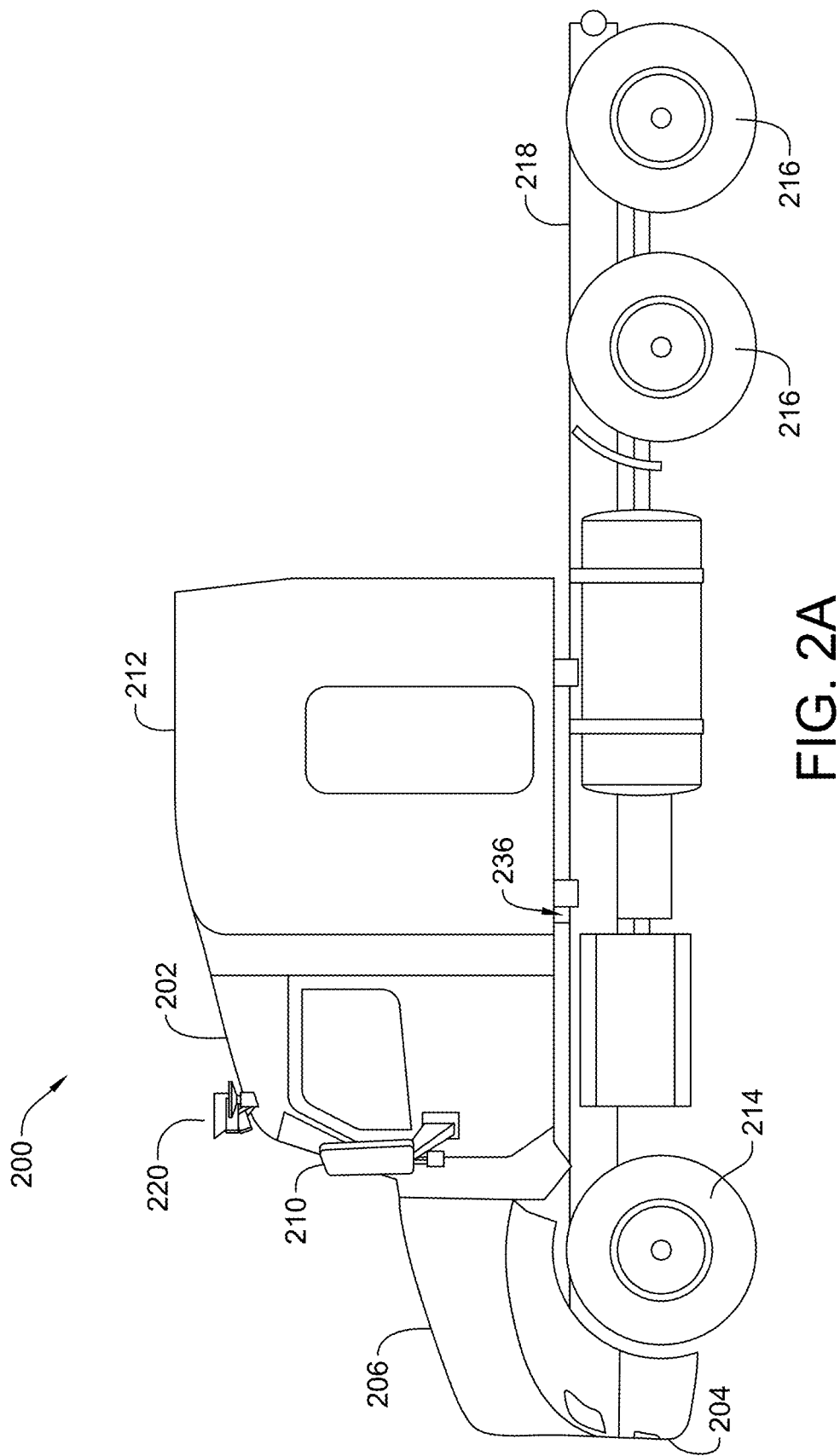

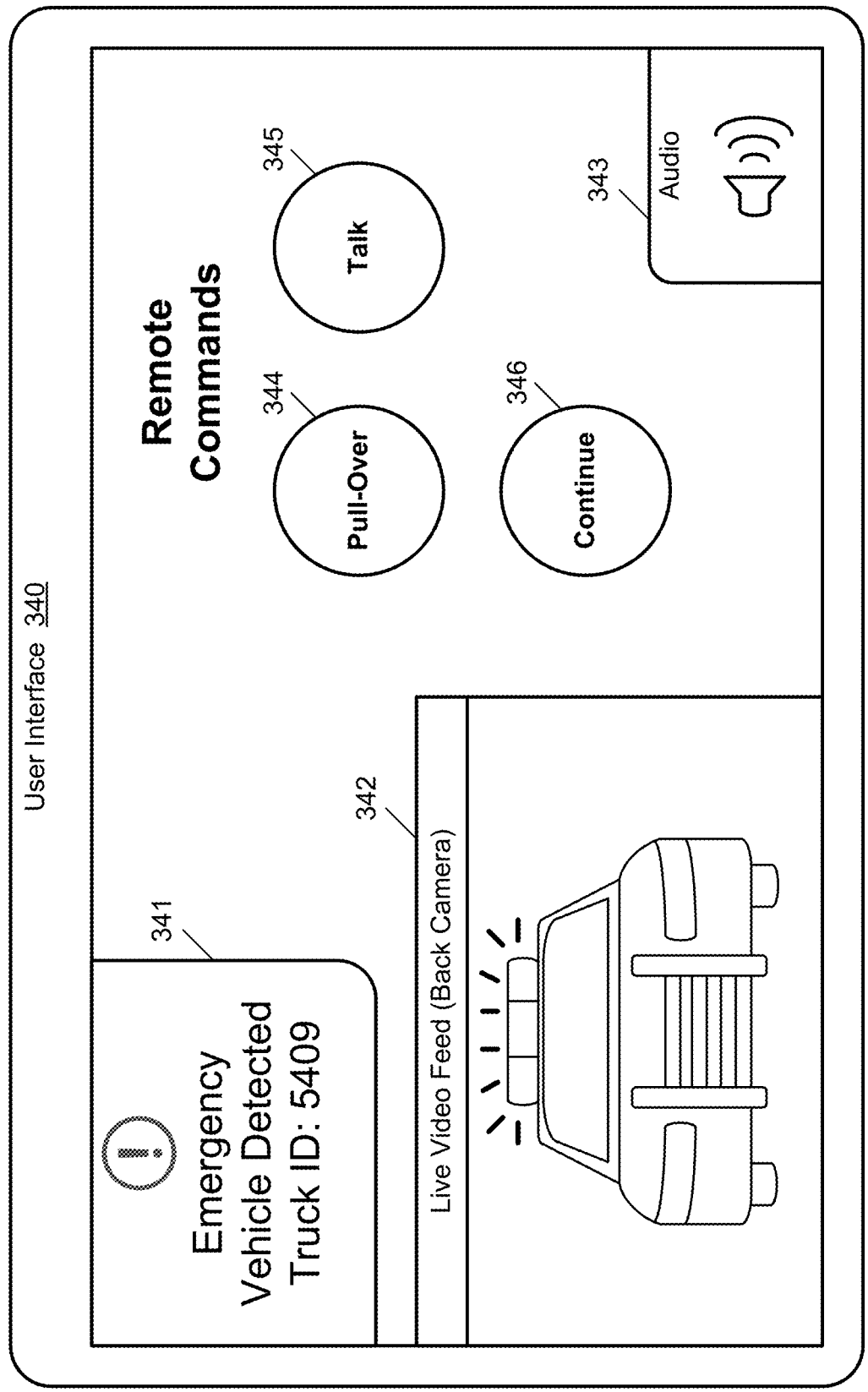

370 FIG. 3E
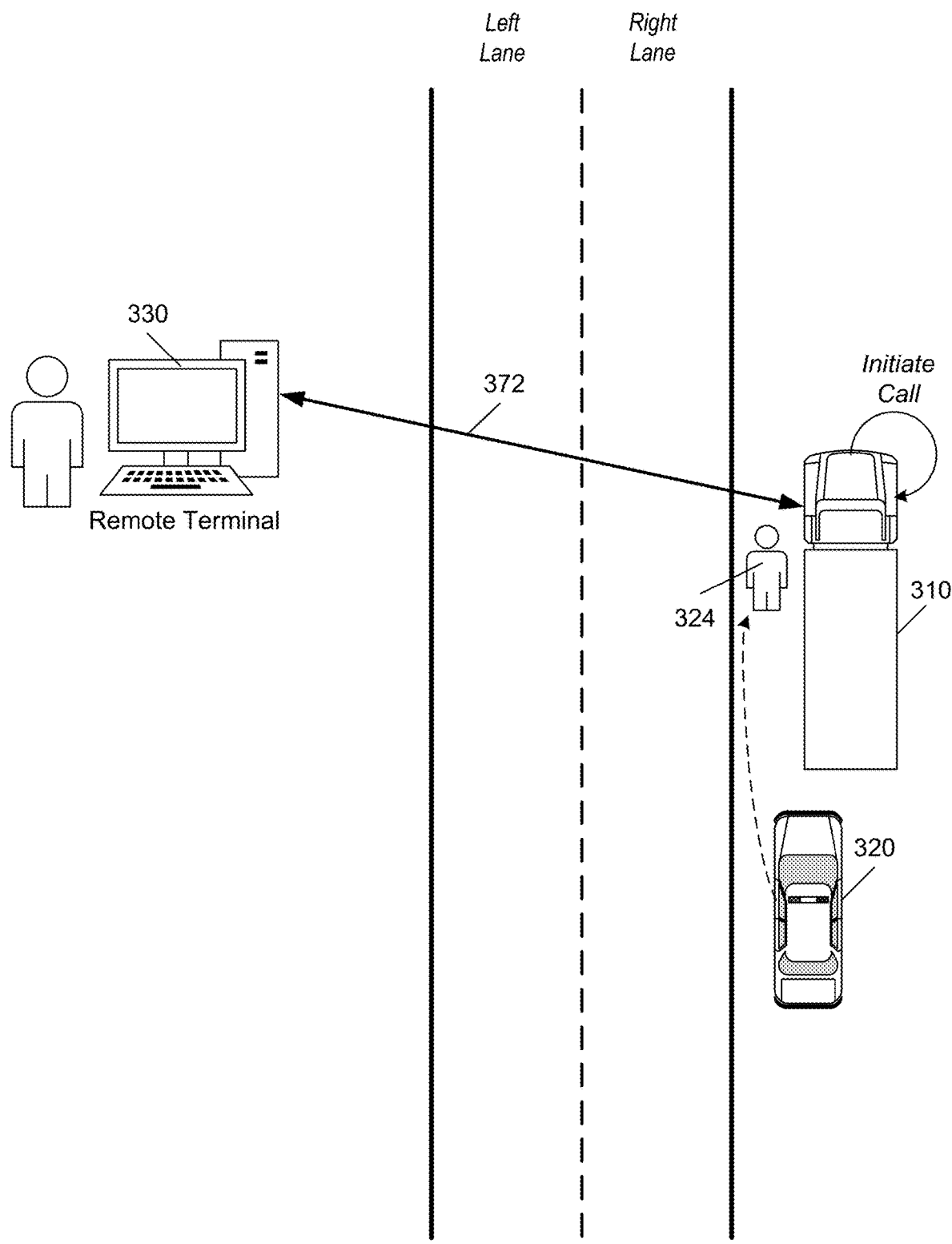

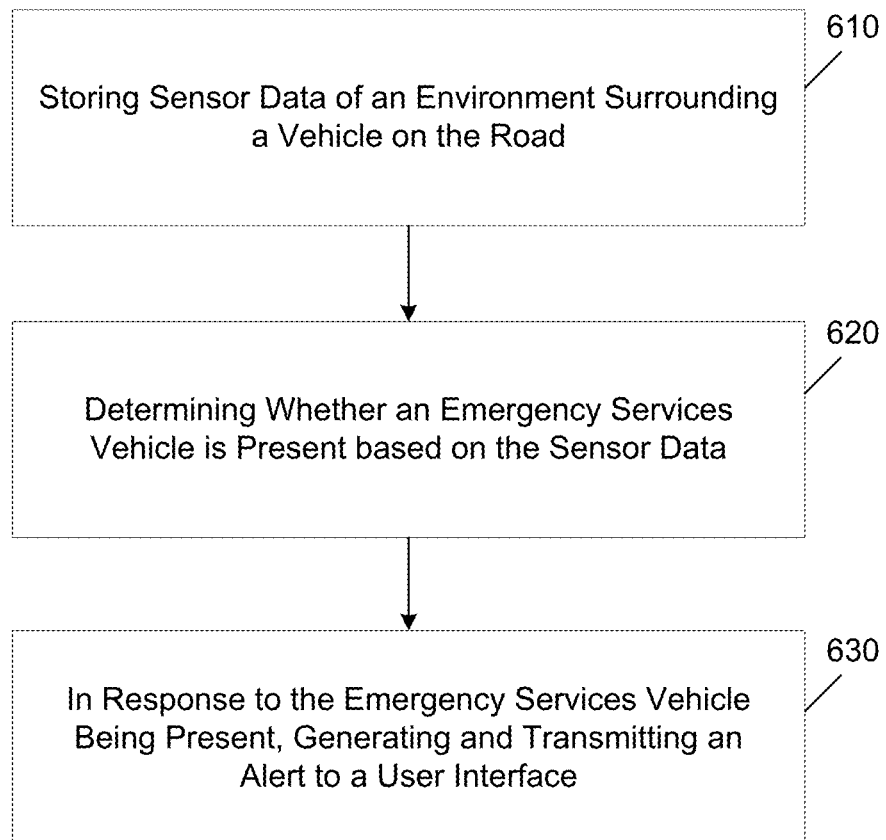

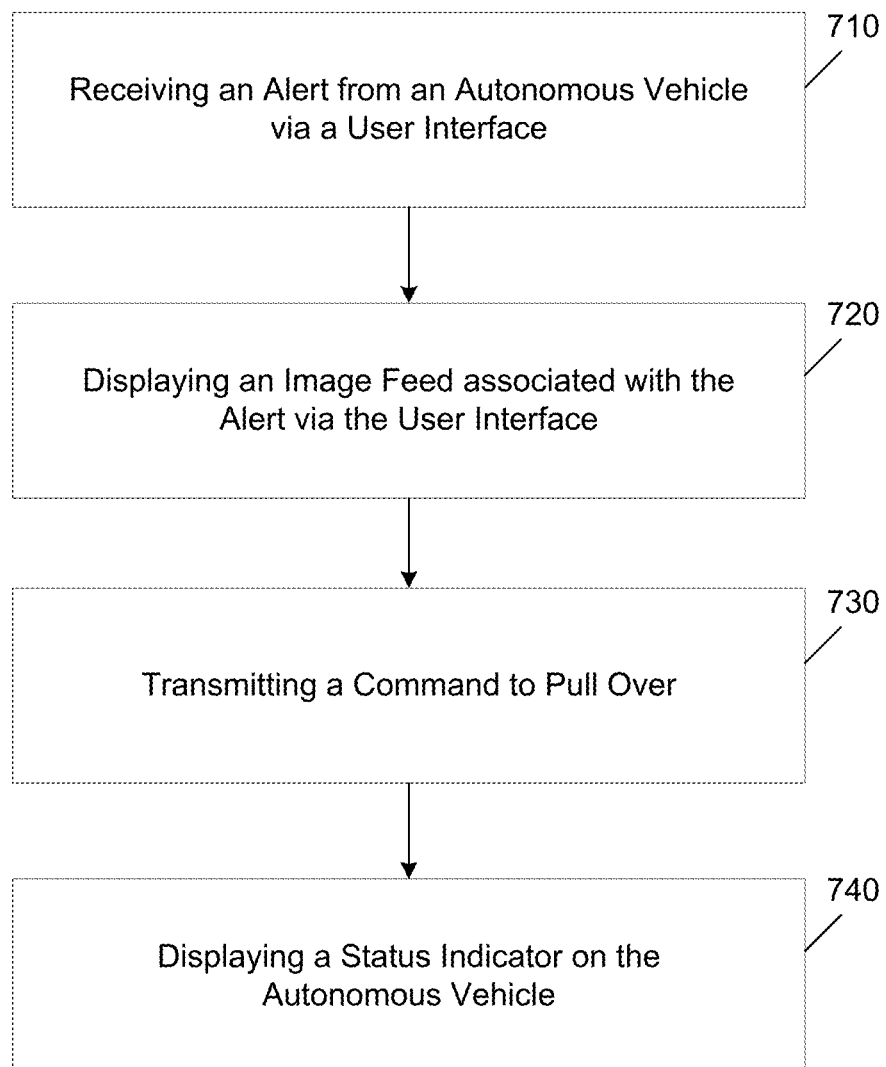

EMERGENCY VEHICLE INTERACTION

BACKGROUND

On a freeway, a siren from an emergency services vehicle (e.g., law enforcement, fire department, ambulance, etc.) can be difficult to hear by another vehicle unless the emergency services vehicle is within a few hundred feet. Because of this, emergency services personnel will often use the emergency lights on their vehicle instead of the siren. Meanwhile, an autonomous vehicle (i.e., a self-driving vehicle) is a promising technology that is predicted to have a comprehensive impact on various industries. Before autonomous vehicles are a viable option, they must be trained to handle situations on the road in the way a human would. However, training an autonomous vehicle to interact with emergency services vehicles is a challenge, especially considering that sirens may not be used all the time.

SUMMARY

The example embodiments are directed to an emergency vehicle interaction system that can be implemented within an autonomous vehicle and that can be used to detect the presences of an emergency services vehicle. For example, sensors on the autonomous vehicle (referred to herein as an ego vehicle) can detect light intensity from an environment surrounding the autonomous vehicle. The computer of the autonomous vehicle may have a machine learning system installed therein. The light intensity data captured by the sensors can be processed using the machine learning model to determine whether an emergency services vehicle (flashing emergency light) is present within the environment surrounding the autonomous vehicle. For example, the process can be performed on an iterative basis (e.g., every 0.01 seconds, 0.1 seconds, 0.5 seconds, 1 second, 2 seconds, 5 seconds, etc.)

Upon detecting the presence of an emergency services vehicle, the autonomous vehicle may send a notification to a remote terminal with a remote operator (person). In addition, the autonomous vehicle may provide an image feed/video feed of the emergency services vehicle to the remote terminal. The video feed may be from the same sensors that are used to detect the light intensity from the surrounding environment and which have the emergency services vehicle in a field of view thereof. At this point, the remote operator can send a command to the autonomous vehicle to pull over or continue on its way without pulling over. For example, the remote operator can view the video feed and determine whether the emergency services vehicle is following the autonomous vehicle or is instead attempting to interact with a different vehicle on the road.

According to an example embodiment, provided is a vehicle that may include a memory configured to store sensor data captured of an environment surrounding the vehicle while the vehicle is on a road, and a processor that may determine whether an emergency vehicle is present in the surrounding environment based on the sensor data, and in response to determining that the emergency vehicle is present in the surrounding environment, transmit a notification of the emergency vehicle being present in the surrounding environment and a video feed of the surrounding environment including the emergency vehicle to a remote terminal associated with the vehicle.

According to another example embodiment, provided is a method that may include one or more of storing sensor data captured of an environment surrounding a vehicle while the vehicle is on a road, determining whether an emergency vehicle is present in the surrounding environment based on the sensor data, and in response to determining that the emergency vehicle is present in the surrounding environment, transmitting a notification of the emergency vehicle being present in the surrounding environment and a video feed of the surrounding environment including the emergency vehicle to a remote terminal associated with the vehicle.

According to another example embodiment, provided is an apparatus that includes a processor that may receive sensor data captured of an environment around a vehicle, determine, via execution of a machine learning model on the sensor data, that an emergency vehicle is present in the environment, and generate a video feed of the environment in which the emergency vehicle is present and transmit the video feed to a remote terminal associated with the vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2C are diagrams illustrating exterior views of a semi-truck that may be used in accordance with example embodiments.

FIGS. 3A-3F are diagrams illustrating a process of interacting with an emergency services vehicle in accordance with example embodiments.

FIG. 6 is a diagram illustrating a method of interacting with an emergency services vehicle in accordance with example embodiments.

FIG. 7 is a diagram illustrating a method of remotely controlling an autonomous vehicle in accordance with example embodiments.

Figure 1:
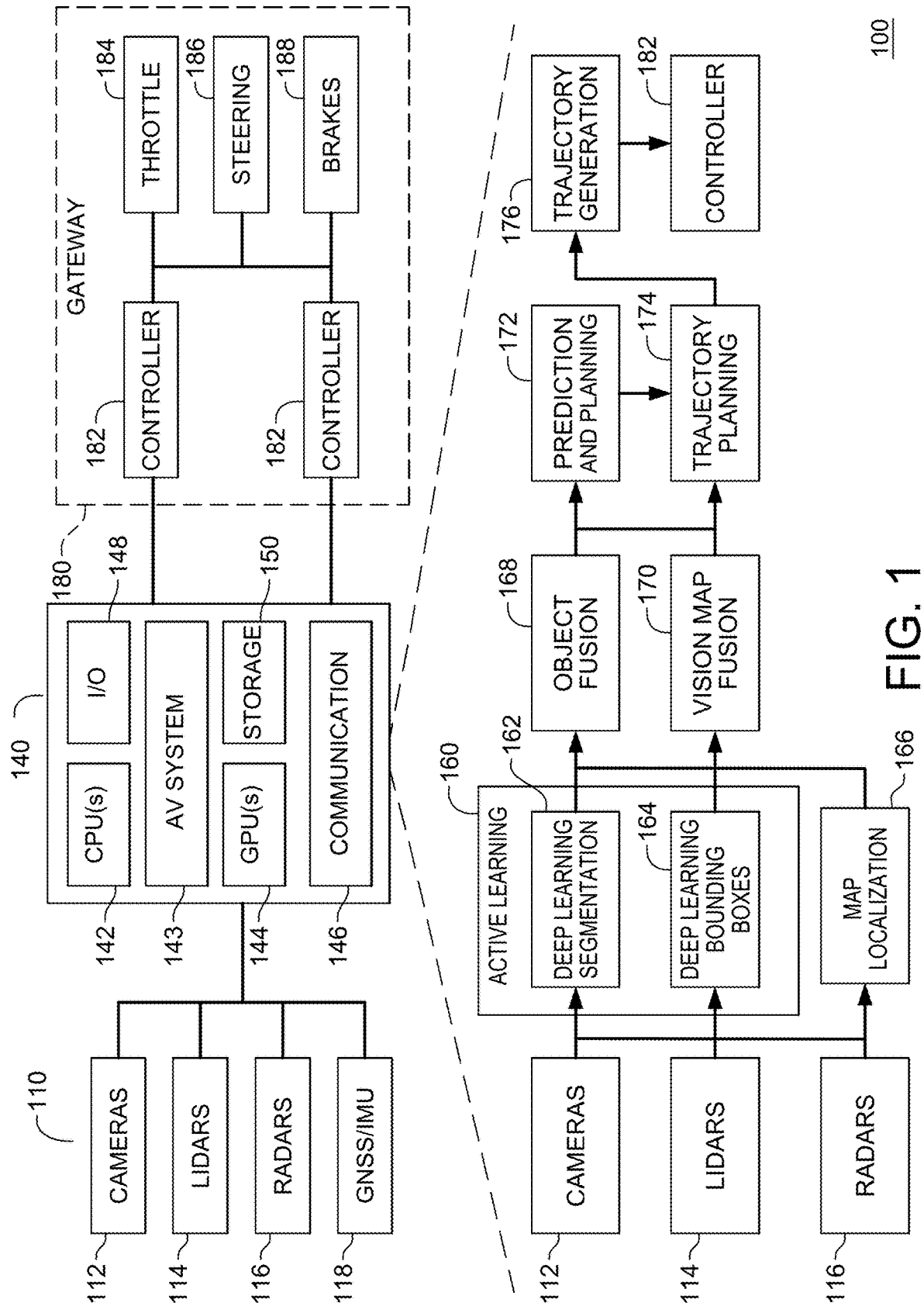
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. It should also be appreciated that the example embodiments are not limited to autonomous semi-trucks, but rather, all types of vehicles, trucks, vans, motor-cycles, and the like, which may travel along a road.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Radio detection and ranging (radar) sensors are used by vehicles to identify objects and other obstacles around the vehicle. The radar sensors may emit electromagnetic waves that reflect (and return reflected waves) when they meet the obstacle. Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data. The lidar sensors, radar sensors, and cameras are exemplary sensors in a vehicle as described herein such as an autonomous vehicle (AV).

In the example embodiments, sensors (e.g., cameras, lidar, radar, etc.) can be used to sense light intensity in an environment surrounding an autonomous vehicle as it travels along a road. The sensed light intensity can be processed using a machine learning model which is trained to detect the presence of emergency services vehicles (e.g., the flashing emergency lights on the emergency services vehicle, etc.) based on the sensed light intensity data. If an emergency services vehicle is present, the autonomous vehicle can transmit a notification/alert to a remote terminal of a remote operator along with an image feed from the autonomous vehicle which shows the emergency services vehicle travelling in the environment surrounding the autonomous vehicle. This allows the remote operator to determine whether or not the autonomous vehicle is being pulled over/stopped by the emergency services vehicle or whether the emergency services vehicle is trying to go around the autonomous vehicle.

The remote terminal may include a dashboard which includes a number of inputs for commanding the autonomous vehicle in a remote fashion. For example, the dashboard may include a pull-over input which can command the autonomous vehicle to initiate a pullover sequence (e.g., if the operator determines the emergency services vehicle is trying to pull over the autonomous vehicle). As another option, the dashboard may include an image feed, an audio feed, and the like, from multiple areas around the autonomous vehicle including behind the autonomous vehicle, to the side of the autonomous vehicle, etc. In some embodiments, the dashboard may provide a video/audio communication signal from the remote operator enabling the remote operator to speak with and visualize any emergency services personnel that approach the autonomous vehicle. As another option, the dashboard may display a notification which provides a phone number or other contact information which enables an emergency services personnel to use their own phone or device to contact the remote technician. Here, the conversation could still be routed to the dashboard or the emergency services person may continue to user their own device.

Figure 2B:
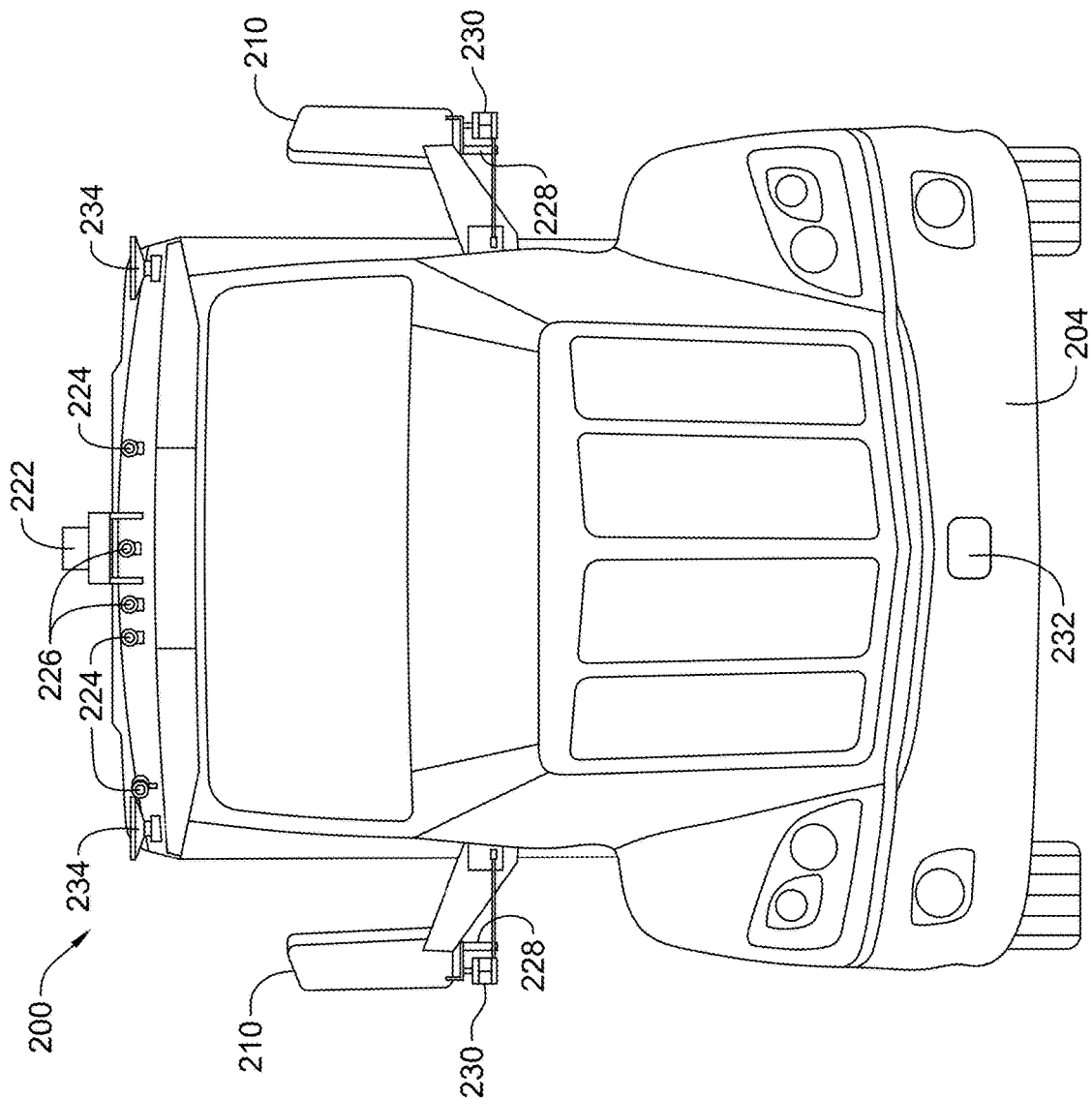
Figure 2C:
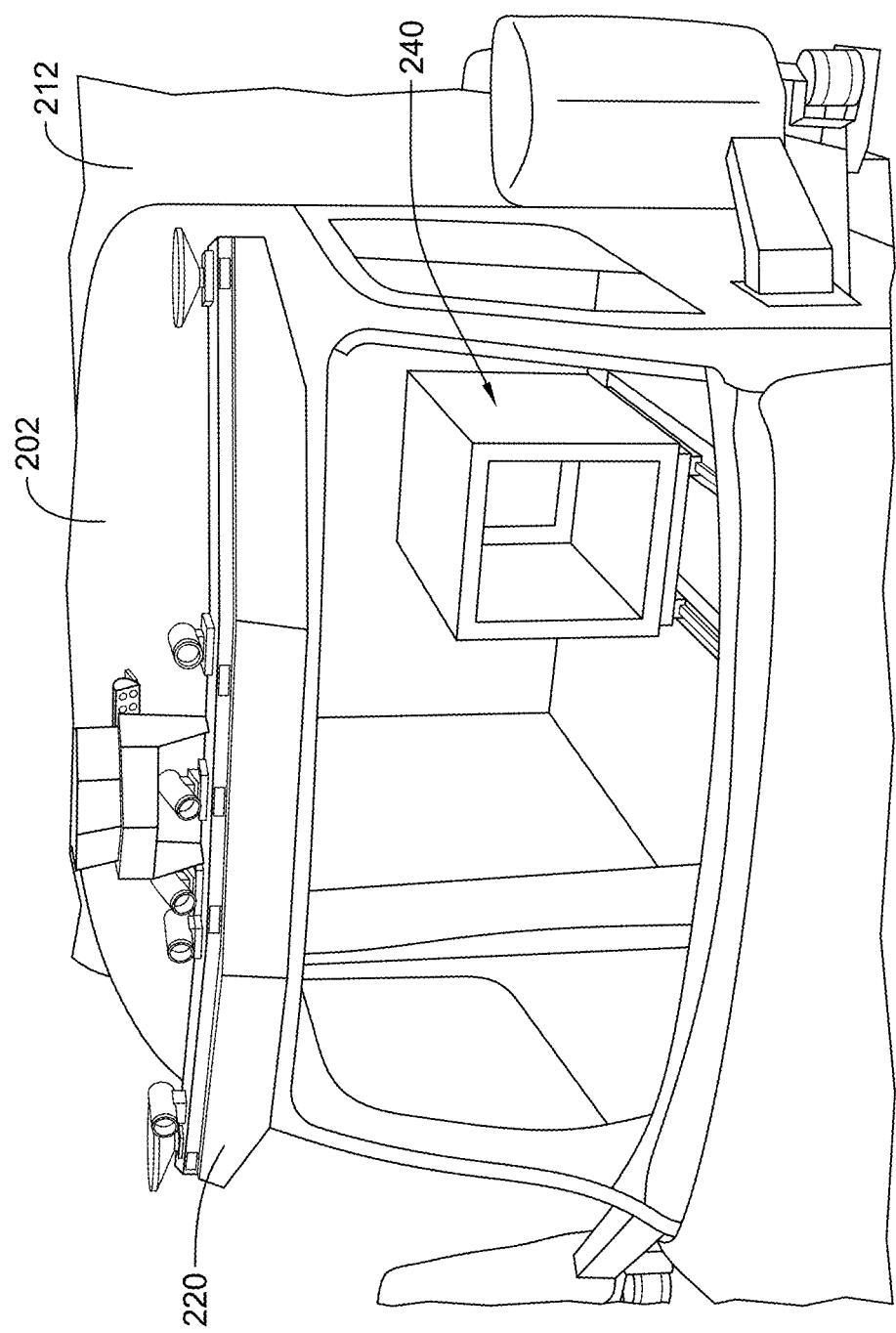

FIG. 1 illustrates a control system 100 that may be deployed in a vehicle such as the semi-truck 200 depicted in FIGS. 2A-2C, in accordance with an example embodiment. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 200 in an autonomous (or semi-autonomous) mode of operation. In some embodiments, the computer system 140 may include an AV system 143 for controlling the system. For example, the AV system 143 may be installed within the computer system 140.

In operation, the control system 100 may be operated to capture images from one or more cameras 112 mounted on various locations of the semi-truck 200 and perform processing (such as image processing) on those images to identify objects proximate or in a path of the semi-truck 200. Further, lidar 114 and radar 116 may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU sensors 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system which may be a component of an inertial navigation system ("INS"). In general, an INS measures and integrates orientation, position, velocities, and accelerations of a moving object. An INS integrates the measured data, where a GNSS is used as a correction to the integration error of the INS orientation calculation. Any number of different types of GNSS/IMU sensors 118 may be used in conjunction with features of the present invention. The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering 186 or brakes 188 as needed to safely operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

In some examples, the computer system 140 may be implemented as a server. Furthermore, the computer system 140 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. For example, image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from radar 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like.

The storage device 150 may include a variety of types and forms of computer readable media. Such media may be any available media that is accessible by computer system/ server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only—those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on a roof of the cab 202 on a sensor rack 220. Sensors may also be mounted on side mirrors 210 as well as other locations. As will be discussed, sensors may be mounted on the bumper 204 as well as on the side of the cab 202 or other locations. For example, a rear facing radar 236 is shown as mounted on a side of the cab 202 in FIG. 2A. Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

Figure 3A:
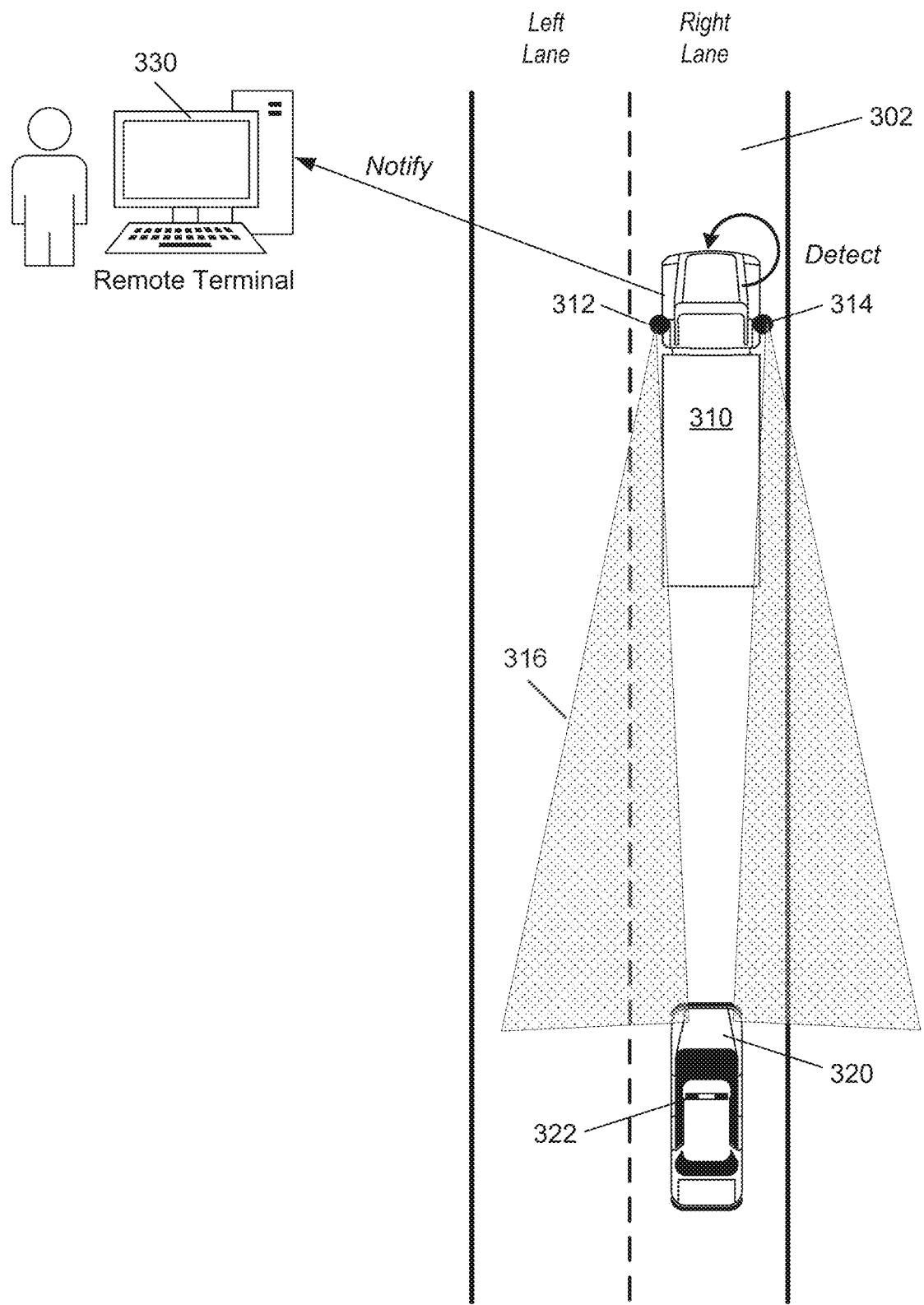

FIGS. 3A-3F illustrate a process of interacting with an emergency services vehicle in accordance with example embodiments. Referring to FIG. 3A, a process 300 of an emergency services vehicle 320 approaching an autonomous vehicle 310 within a lane 302 on a freeway is shown and described. Here, the autonomous vehicle 310 is a semi-truck but embodiments are not limited thereto. The autonomous vehicle 310 includes sensors 312 and 314 that are otherwise coupled to or installed on the autonomous vehicle 310 and which have a field of view 316 of the environment surrounding the autonomous vehicle 310. In this example, the sensors 312 and 314 are installed near side mirrors of the autonomous vehicle 310 and can sense light and other data from a surrounding environment of the autonomous vehicle 310 including behind the autonomous vehicle 310. The sensors 312 and 314 can detect light intensity within the surrounding environment and forward the sensed image data to a computer of the autonomous vehicle 310.

The emergency services vehicle 320 may include lights (flashing lights) that are emitted from a lighting system 322 such as on top of the emergency services vehicle 320 or the like. The intensity of the light from the lighting system 322 may continue to increase as the emergency services vehicle 320 gets closer to the autonomous vehicle 310. The autonomous vehicle may include a machine learning model (e.g., further described with respect to FIG. 5) which is installed in a computer thereof. The machine learning model may analyze the light intensity data captured by the sensors 312 and 314 and determine whether or not the emergency services vehicle 320 is present. That is, the machine learning model uses light intensity measured from an environment surrounding the autonomous vehicle 310 to determine whether an emergency light/emergency vehicle is present within the environment surrounding the autonomous vehicle 310.

When the emergency services vehicle 320 is detected, the autonomous vehicle 310 may transmit an alert/notification to a remote terminal 330 which may include a remote technician that supports the autonomous vehicle 310 (and possibly a larger fleet of autonomous vehicles, etc.) Here, the remote technician may use the remote terminal 330 to send a command to the autonomous vehicle 310 to pull over or to continue without pulling over. For example, the remote terminal 330 may include a user interface which displays the alert from the autonomous vehicle 310. The alert may be transmitted via a software program/application that is installed on both the remote terminal 330 and the autonomous vehicle 310. Here, the autonomous vehicle 310 and the remote terminal 330 may establish a wireless communication channel between each other via the software program.

The remote terminal 330 may also display a video feed from the autonomous vehicle 310. For example, the video feed may be a live video feed from the sensors 312 and 314. The live video feed allows the remote technician to visualize the emergency services vehicle 320 within the surrounding environment of the autonomous vehicle 310. Thus, the operator can decide whether the emergency services vehicle 320 is attempting to stop the autonomous vehicle 310 or another vehicle (or no vehicle).

FIG. 3B illustrates a user interface 340 that may be displayed on the remote terminal 330 shown in FIG. 3A. The user interface 340 may include a dashboard with a notification area 341 that is populated with messages and other alerts from the autonomous vehicle and different controls that enable the operator of the remote terminal 330 to send commands/instructions to the autonomous vehicle 310. For example, the controls may include a pull-over input mechanism 344, a talk input mechanism 345, and a continue driving input mechanism 346. Other controls may also be present.

Furthermore, the user interface 340 may also provide a viewing window 342 with a live video feed (or feeds) from the autonomous vehicle 310. For example, the video feed may include a live video feed of the emergency services vehicle as it is approaching the autonomous vehicle 310 from behind. Furthermore, the remote terminal 330 may include a microphone that enables the operator to speak with an emergency services personnel if they decide to approach the autonomous vehicle 310. In addition, the remote terminal may include speakers for listening to an emergency services personnel when they approach the autonomous vehicle 310 and speak. An audio icon 343 may be displayed on the user interface 340 which indicates that a person standing next to the autonomous vehicle 310 is speaking.

Figure 3C:
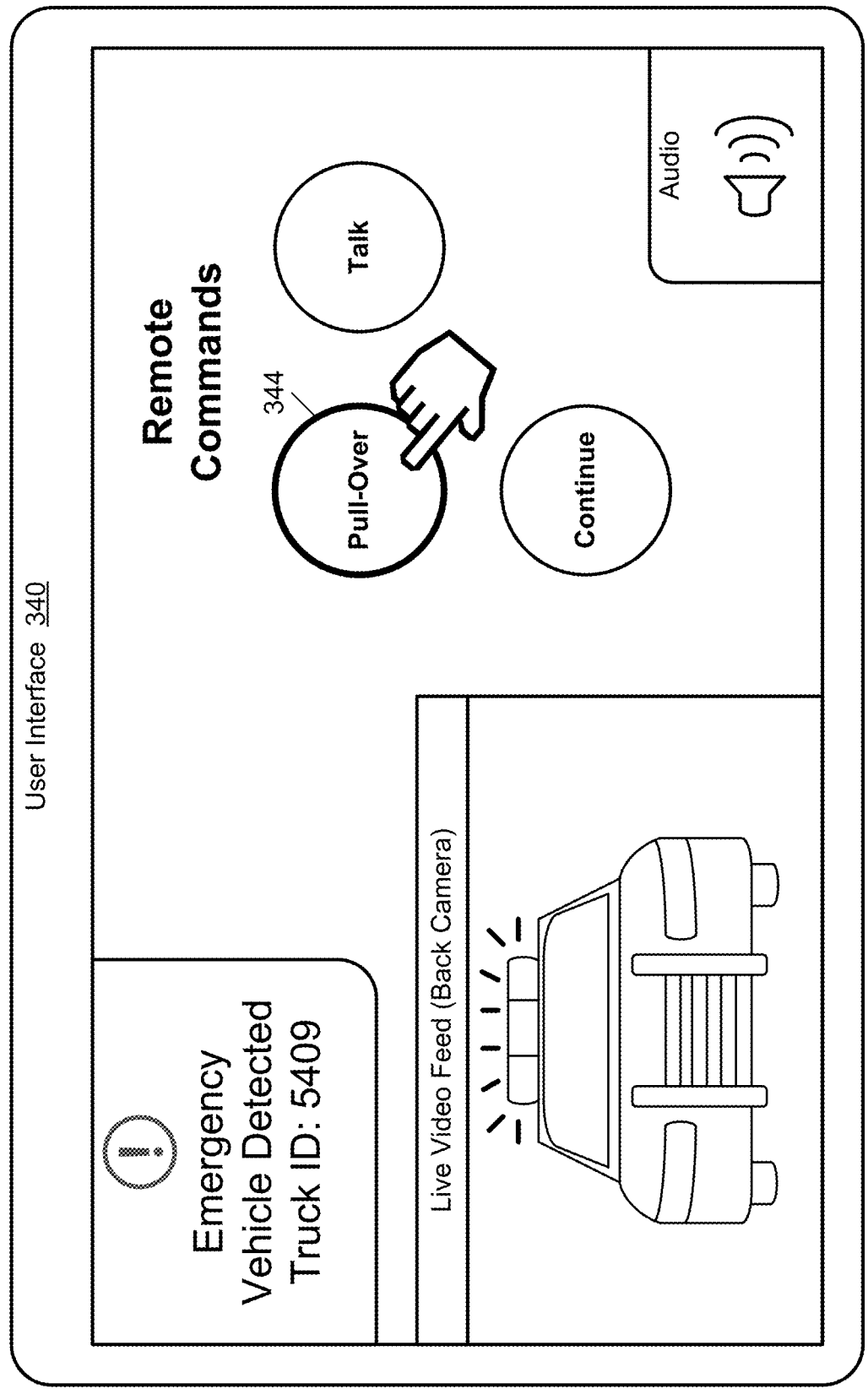

FIG. 3C illustrates a process 350 of controlling the autonomous vehicle 310 to pull over on the road. Referring now to FIG. 3C, the operator may press or otherwise select the pull-over input mechanism 344 within the user interface 340 using a finger, mouse, pointer, etc. The pull-over input mechanism 344 may include a graphical user interface element such as a button, menu item, or the like. The command to pull over may be sent from the remote terminal 330 to the autonomous vehicle 310 as shown in FIG. 3D.

Figure 3D:
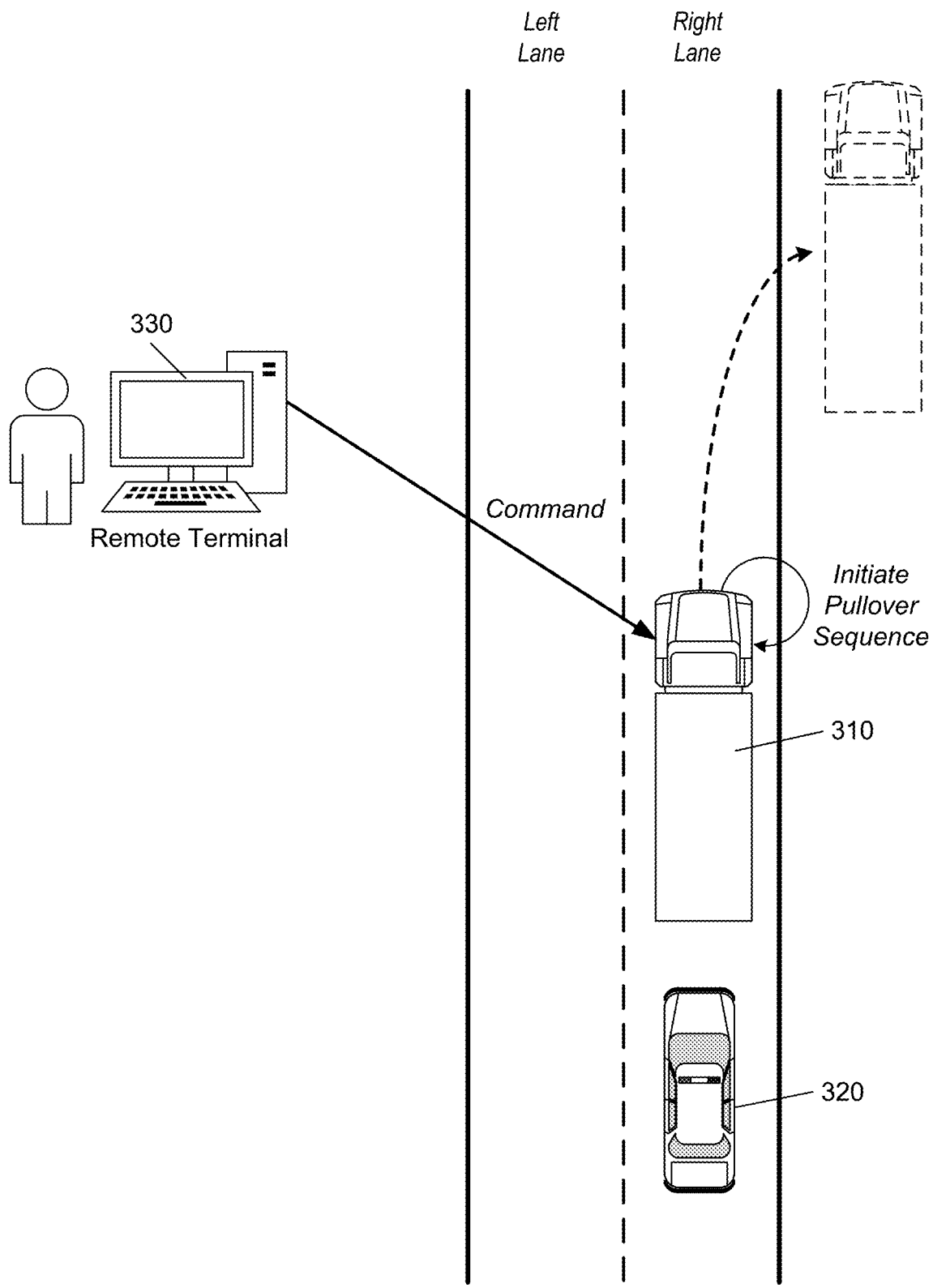

Referring to FIG. 3D, a process 360 of the autonomous vehicle 310 pulling over to the side of the road is shown. In this example, the autonomous vehicle 310 receives the instruction to pull over from the remote terminal 330. In response, the computer of the autonomous vehicle 310 may initiate a pull-over sequence. The pull-over sequence may include steps for identifying a safe place to pull over and reducing speed of the autonomous vehicle 310 until the autonomous vehicle has come to a stop. In the example of FIG. 3D, the autonomous vehicle 310 pulls over to the shoulder of the road (adjacent to the current lane of the ego vehicle). The vehicle does not need to pull over to a shoulder, but may find another spot such as a side of a road, a side street, or the like. In addition, the autonomous vehicle 310 may activate a turn signal to notify any other vehicles on the road and also the emergency services personnel that the ego vehicle is pulling over.

Figure 4:
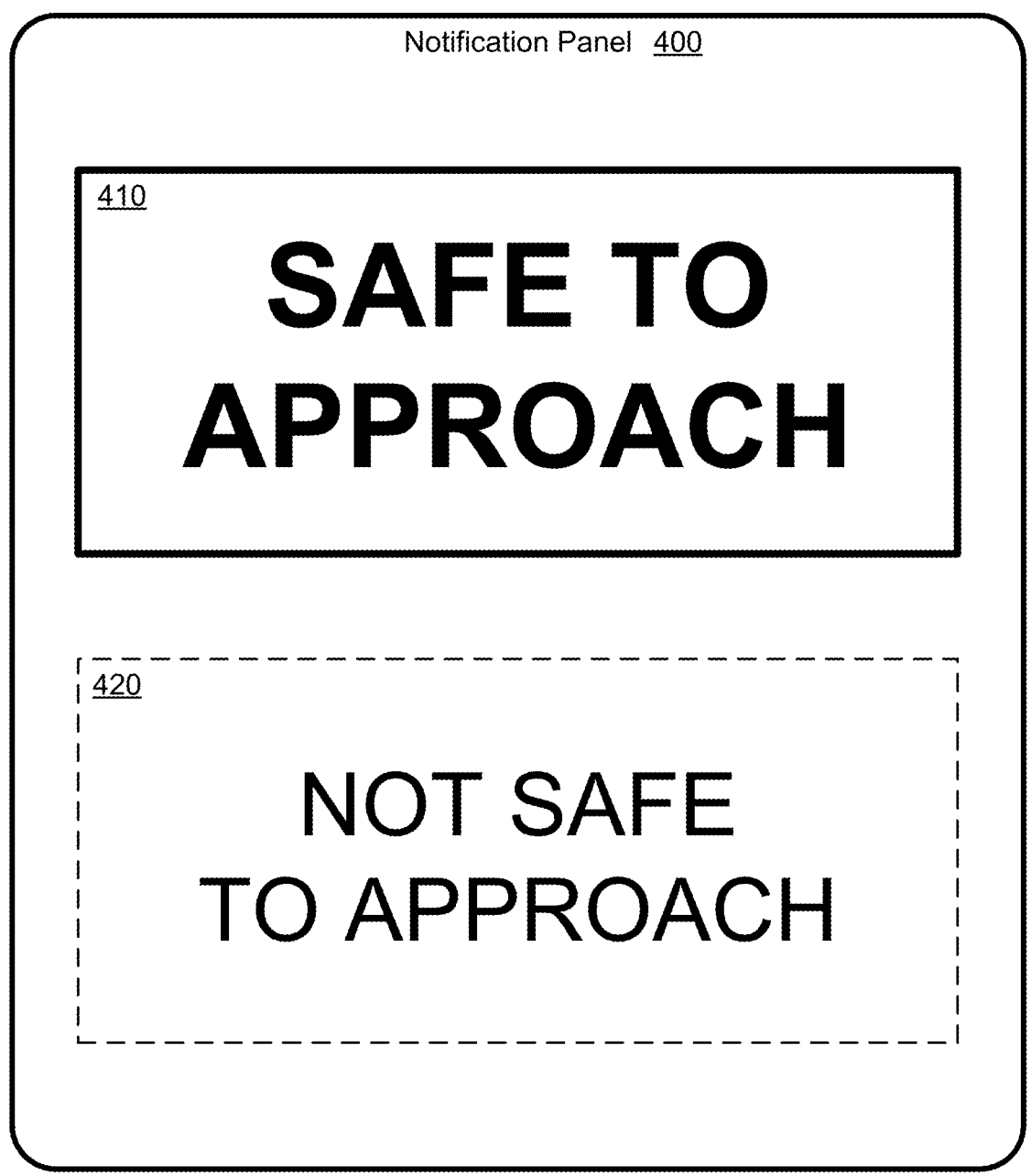
FIG. 4 is a diagram illustrating a notification panel which may be displayed on an autonomous vehicle in accordance with an example embodiment.

FIG. 3E illustrates a process 370 of an emergency services person 324 (e.g., an officer, a firefighter, a medical professional, etc.) approaching the autonomous vehicle 310 after the autonomous vehicle 310 has come to a stop on the side of the road. Here, the computer of the autonomous vehicle 310 may detect the person 324 as they come up to the side or the front of the autonomous vehicle. In response, the autonomous vehicle 310 may display a status indicator thereon which indicates whether the autonomous vehicle 310 is safe to approach. An example of the status indicator is shown in FIG. 4. Furthermore, the autonomous vehicle 310 may generate a video feed of the person 324 and send the video feed to the remote terminal 330. For example, the video feed may be transmitted via a wireless channel 372 established between the autonomous vehicle 310 and the remote terminal 330.

Figure 3F:
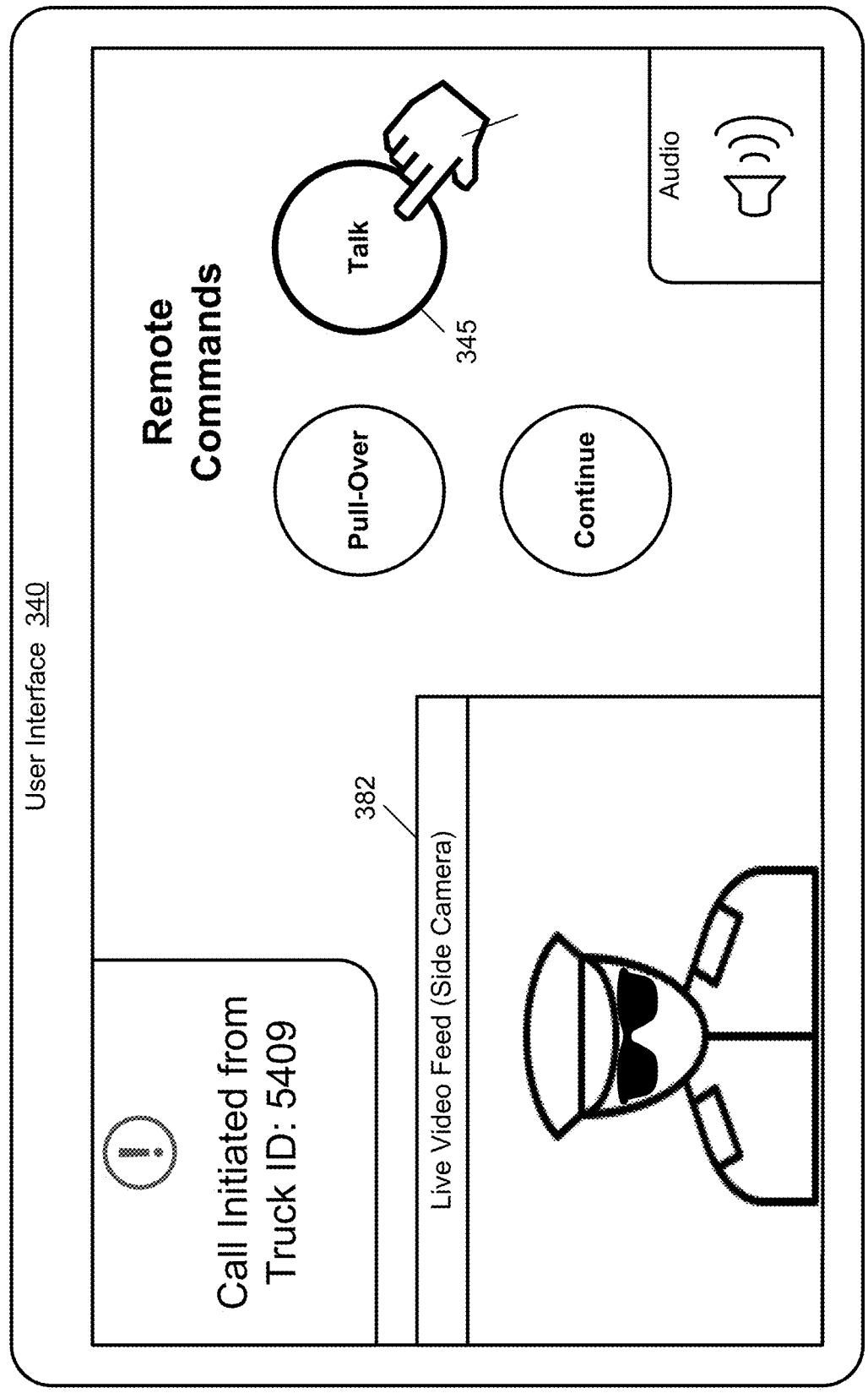

FIG. 3F illustrates a process 380 of communicating with the person 324 that approaches the autonomous vehicle 310 shown in FIG. 3E. Referring to FIG. 3F, a video feed 382 of the person 324 is shown within the user interface 340 of the remote terminal 330. The operator may then use the user interface 340 to communicate with the person 324 using audio and/or video. That is, the remote terminal 330 may capture audio and/or video of the operator and send the audio and/or video to a display screen within the autonomous vehicle 310. As another example, just audio may be transmitted to the autonomous vehicle 310 and be audible via one or more speakers within the autonomous vehicle 310. In this example, the autonomous vehicle 310 may unlock a door, roll down a window, or the like to allow the person 324 access to the interior of the autonomous vehicle 310. Here, the remote operator may press on the talk input mechanism 345 and speak with the person 324 standing next to the autonomous vehicle 310. As another example, a notification may be displayed or otherwise posted on a sign within the autonomous vehicle 310 with contact information for emergency services personnel to use their own device to contact the remote operator.

In some embodiments, the operator of the remote terminal 330 may determine that the emergency services vehicle is not trying to pullover the autonomous vehicle 310 but is instead doing something else. In this case, the operator may send a command to the autonomous vehicle 310 to continue driving without pulling over.

As another example, the remote terminal 330 may receive an alert from the autonomous vehicle 310 indicating that the emergency services vehicle is present and the remote terminal 330 not respond to the alert. For example, the autonomous vehicle 310 may wait for a threshold of time (e.g., 5 seconds, 10 seconds, etc.). If no response is received from the remote terminal 330 within this threshold of time, the autonomous vehicle 310 may automatically initiate a pull-over sequence as a default safety mechanism.

FIG. 4 illustrates a notification panel 400 which may be displayed on an autonomous vehicle in accordance with an example embodiment. As an example, the notification panel 400 may be a sign or other structure that is displayed on an exterior of an autonomous vehicle when the autonomous vehicle has detected an emergency services vehicle. Here, the notification panel 400 may include a plurality of status indicators 410 and 420. In this example, the status indicator 410 indicates the vehicle is safe to approach while the status indicator 420 indicates that the vehicle is not safe to approach. The notification panel 400 may include a backlight that illuminates only one of the different status indicators at a time. As another example, the notification panel 400 may include a graphical user interface or other display screen which can display images of signs.

In the example of FIG. 4, the status indicator 410 is displayed indicating that the vehicle is safe to approach. It is also possible that other status indicators may be used and that the embodiments are not limited to those shown in FIG. 4. The decision on which indicator to display may be determined by the vehicle itself. For example, the autonomous vehicle may run a systems check on a number of critical systems including the engine, the braking, the transmission, and the like, and decide whether or not the vehicle is safe to approach. As another example, a remote operator may send a command to the autonomous vehicle which commands one of the status indicators to be displayed.

Figure 5:
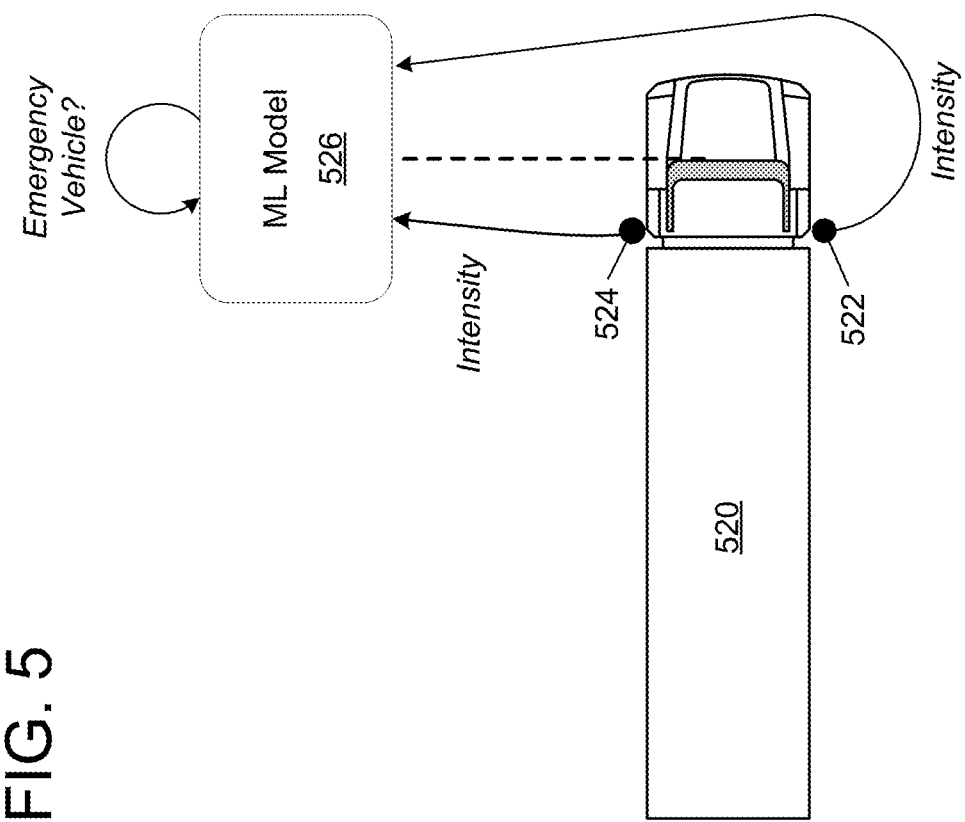
FIG. 5 is a diagram illustrating a process of detecting the presence of an emergency services vehicle using machine learning in accordance with example embodiments.
Figure 5:
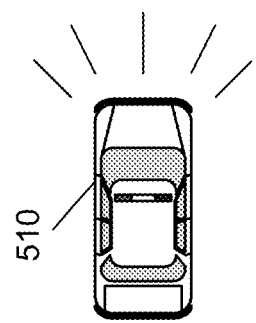

FIG. 5 illustrates a process 500 of detecting the presence of an emergency services vehicle 510 using a machine learning model 526 in accordance with example embodiments. Referring to FIG. 5, an autonomous vehicle 520 (e.g., self-driving semi-truck, etc.) is travelling along a road (not shown) such as a freeway or a highway. As an example, sensors 522 and 524 may be attached/installed on a backside of the autonomous vehicle 520 (or any side of the vehicle) and may capture light intensity data from an environment surrounding the autonomous vehicle 520. The sensing may be performed on an iterative basis (e.g., every 0.2 seconds, 0.5 seconds, 1 second, etc.)

In this example, a computer of the autonomous vehicle 520 includes the machine learning model 526 installed therein. The machine learning model 526 may receive the light intensity data captured by the sensors 522 and 524, and determine whether or not an emergency services vehicle is present (e.g., whether the emergency services vehicle 510 is present, etc.) For example, the light intensity data may include red-blue-green (RGB) data. The computer may identify light intensity data in a particular color (e.g., green channel, etc.) and convert it into a hue intensity value also referred to as saturation. The hue intensity value can be input to the machine learning model 526 and used in the decision making process.

FIG. 6 illustrates a method 600 of interacting with an emergency services vehicle in accordance with example embodiments. For example, the method 600 may be performed by an autonomous vehicle. Referring to FIG. 6, in 610, the method may include storing sensor data captured of an environment surrounding the vehicle while the vehicle is on a road. For example, the sensor data may include image data, video data, audio data, and the like. The sensor data may include red-green-blue (RGB) image data and the like.

In 620, the method may include determining whether an emergency vehicle is present in the surrounding environment based on the sensor data. For example, the determining may include determining whether or not the emergency services vehicle is present in the surrounding environment via execution of a machine learning model on light intensity values within the sensor data. In response to determining that the emergency vehicle is present in the surrounding environment, in 630 the method may include generating an alert including a notification of the emergency vehicle being present in the surrounding environment and transmitting the alert to a user interface. The transmission may include transmission of a video feed of the surrounding environment including the emergency vehicle to a remote terminal associated with the vehicle such as a remote guardian.

In some embodiments, the method may further include establishing a wireless communication channel between the vehicle and the remote terminal, wherein the transmitting comprises transmitting the video feed via the established wireless communication channel between the vehicle and the remote terminal. In some embodiments, the method may further include receiving a command to stop from the remote terminal, and in response, controlling the vehicle to pull over and stop. In some embodiments, the method may further include displaying an indicator on the vehicle which while the vehicle is stopped which indicates whether or not the vehicle is safe to approach.

In some embodiments, the method may further include transmitting one or more of an audio feed and a video feed of a person standing on a side of the vehicle to the remote terminal. In some embodiments, the method may further include automatically controlling the vehicle to pull over and stop when a command is not received from the remote terminal within a predetermined threshold of time from when the notification was sent to the remote terminal. In some embodiments, the method may further include controlling the vehicle to maintain its current speed in response to receiving a command to continue from the remote terminal.

FIG. 7 illustrates a method 700 of remotely controlling an autonomous vehicle in accordance with example embodiments. For example, the method 700 may be performed via a remote terminal with a wireless channel to the autonomous vehicle. Referring to FIG. 7, in 710, the method may include receiving an alert from an autonomous vehicle via a user interface. The alert may indicate that the autonomous vehicle has detected an emergency services vehicle. In 720, the method may include displaying a video feed/image feed from the autonomous vehicle via the user interface of the remote terminal. For example, the video feed may include a live feed of a field of view from the autonomous vehicle. The live feed may include a view of the environment surrounding the autonomous vehicle where the emergency services vehicle is present.

In 730, the method may include transmitting a command to the autonomous vehicle based on an input detected on the user interface. For example, the command may instruct the autonomous vehicle to initiate a pull-over sequence. In 740, the method may further including transmitting a command to display a status indicator on the autonomous vehicle which indicates whether or not the vehicle is safe to approach. For example, if a law enforcement officer is attempting to stop the autonomous vehicle, there is a good chance the law enforcement officer will also approach the vehicle. The status indicator can notify the officer of an potential danger with the vehicle. In addition, any of the other examples described herein may also be performed by the method in FIG. 7.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IOT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A vehicle, comprising:
a hardware sensor configured to capture light intensity data of an environment surrounding the vehicle;
a network interface; and
a processor configured to:
determine whether an emergency services vehicle is present in the environment surrounding the vehicle based on execution of a machine learning model on the light intensity data captured by the hardware sensor;
in response to determining that the emergency services vehicle is present in the environment surrounding the vehicle, generate an alert to indicate that the vehicle has detected the emergency services vehicle;
control the network interface to transmit the alert from the vehicle to a user interface of a remote computing terminal over a computer network;
receive from an input by a user on the user interface, a command to control the vehicle to stop;
in response to receiving the input, initiate a pull-over sequence for the vehicle;
execute a system check of at least one of an engine of the vehicle, a braking system of the vehicle, and a transmission of the vehicle;
determine whether the vehicle is safe to approach based on execution of the system check;
based on determining that the vehicle is safe to approach, display, on the vehicle, an indicator to a person that the vehicle is safe to approach; and
further based on determining that the vehicle is safe to approach, provide to the person access to an interior of the vehicle.

2. The vehicle of claim 1, wherein the processor is configured to determine whether the emergency services vehicle is present in the environment surrounding the vehicle based on execution of the machine learning model on light intensity values within the captured light intensity data.

3. The vehicle of claim 1, wherein the processor is configured to establish a wireless communication channel between the vehicle and the remote computing terminal, and transmit a video feed from the hardware sensor to the remote computing terminal via the established wireless communication channel between the vehicle and the remote computing terminal.

4. The vehicle of claim 1, wherein the processor is configured to transmit a notification of determining that the emergency services vehicle is present in the environment surrounding the vehicle and a video feed of the environment surrounding the vehicle including the emergency services vehicle to the remote computing terminal.

5. The vehicle of claim 4, wherein the processor is further configured to receive a command to the vehicle from the remote computing terminal, and in response, control the vehicle to pull over and stop.

6. The vehicle of claim 5, wherein the processor is further configured to display the indicator on an exterior surface of the vehicle while the vehicle is stopped to indicate that the vehicle is safe to approach.

7. The vehicle of claim 1, wherein the processor is further configured to transmit one or more of an audio feed and a video feed of a person standing in the environment surrounding the vehicle to the remote computing terminal.

8. The vehicle of claim 1, wherein the processor is further configured to automatically control the vehicle to pull over and stop when a command is not received from the remote computing terminal within a predetermined threshold of time from when the alert was sent to the remote computing terminal.

9. The vehicle of claim 1, wherein the processor is further configured to control the vehicle to maintain its current speed in response to receiving a command to continue from the remote computing terminal.

10. A method, comprising:
capturing light intensity data of an environment surrounding a vehicle via a hardware sensor of the vehicle;
determining whether an emergency services vehicle is present in the environment surrounding the vehicle based on execution of a machine learning model on the light intensity data captured by the hardware sensor;
in response to determining that the emergency services vehicle is present in the environment surrounding the vehicle, generating an alert to indicate that the vehicle has detected the emergency services vehicle;
transmitting the alert from the vehicle to a remote computing terminal over a computer network;
receiving from an input by a user on a user interface, a command for controlling the vehicle to stop;
in response to receiving the input, initiating a pull-over sequence for the vehicle;
executing a system check of at least one of an engine of the vehicle, a braking system of the vehicle, and a transmission of the vehicle;
determining whether the vehicle is safe to approach based on execution of the system check;
based on determining that the vehicle is safe to approach, displaying, on the vehicle, an indicator to a person that the vehicle is safe to approach; and
further based on determining that the vehicle is safe to approach, providing to the person access to an interior of the vehicle.

11. The method of claim 10, wherein the determining comprises determining whether the emergency services vehicle is present in the
environment surrounding the vehicle based on execution of the machine learning model on light intensity values within the captured light intensity data.

12. The method of claim 10, wherein the method further comprises establishing a wireless communication channel between the vehicle and the remote computing terminal, wherein the transmitting comprises transmitting a video feed from the hardware sensor to the remote computing terminal via the established wireless communication channel between the vehicle and the remote computing terminal.

13. The method of claim 10, further comprising a notification of determining that the emergency services vehicle is present in the environment surrounding the vehicle and a video feed of the environment surrounding the vehicle including the emergency services vehicle to the remote computing terminal.

14. The method of claim 13, wherein the method further comprises receiving a command to stop the vehicle from the remote computing terminal, and in response, controlling the vehicle to pull over and stop.

15. The method of claim 14, wherein the method further comprises displaying the indicator on an exterior surface of the vehicle while the vehicle is stopped to indicate that the vehicle is safe to approach.

16. The method of claim 10, wherein the method further comprises transmitting one or more of an audio feed and a video feed of a person standing in the environment surrounding the vehicle to the remote computing terminal.

17. The method of claim 10, wherein the method further comprises automatically controlling the vehicle to pull over and stop when a command is not received from the remote computing terminal within a predetermined threshold of time from when the alert was sent to the remote computing terminal.

18. The method of claim 10, wherein the method further comprises controlling the vehicle to maintain its current speed in response to receiving a command to continue from the remote computing terminal.

19. An apparatus comprising:
a hardware sensor configured to capture light intensity data; and
a processor configured to:
receive the light intensity data captured of an environment surrounding a vehicle from the hardware sensor;
determine that an emergency services vehicle is present in the environment surrounding the vehicle based on execution of a machine learning model on the light intensity data received from the hardware sensor;
in response to the determination that the emergency services vehicle is present in the environment surrounding the vehicle, generate an alert to indicate that the vehicle has detected the emergency services vehicle;
transmit the alert from the vehicle to a user interface of a remote computing terminal over a computer network;
receive from an input by a user on the user interface, a command to control the vehicle to stop;
in response to receiving the input, initiate a pull-over sequence for the vehicle;
execute a system check of at least one of an engine of the vehicle, a braking system of the vehicle, and a transmission of the vehicle;
determine whether the vehicle is safe to approach based on execution of the system check;
based on determining that the vehicle is safe to approach, display, on the vehicle, an indicator to a person that the vehicle is safe to approach; and
further based on determining that the vehicle is safe to approach, provide to the person access to an interior of the vehicle.

20. The apparatus of claim 19, wherein the processor is configured to establish a wireless communication channel between the vehicle and the remote computing terminal, and transmit a video feed of the environment in which the emergency services vehicle is present via the established wireless communication channel between the vehicle and the remote computing terminal.

* * * * *